United States Patent [19]

Greatorex

[11] Patent Number: 5,246,474
[45] Date of Patent: Sep. 21, 1993

[54] PROCESS FOR MANUFACTURING A SELF-SUPPORTING FILTER UNIT

[75] Inventor: Anthony T. Greatorex, Syston, United Kingdom

[73] Assignee: British United Shoe Machinery Limited, Belgrave, England

[21] Appl. No.: 872,902

[22] Filed: Apr. 23, 1992

[30] Foreign Application Priority Data

May 4, 1991 [GB] United Kingdom ............... 9109777
Sep. 3, 1991 [GB] United Kingdom ............... 9118764

[51] Int. Cl.$^5$ .................... B01D 29/17; B01D 46/24
[52] U.S. Cl. .................... 55/381; 55/382; 55/484; 55/521; 55/528; 55/DIG. 5; 264/324; 264/342 R
[58] Field of Search ............... 55/361, 380–382, 55/484, 497, 514, 521, 527, 528, DIG. 5, 524; 210/493.1; 226/88; 264/257, 258, 286, 287, 324, 342 R, DIG. 42; 425/335, 336, 390, 393, 396; 493/920, 941

[56] References Cited

U.S. PATENT DOCUMENTS

| | | | |
|---|---|---|---|
| 2,576,864 | 11/1951 | Valente | 55/DIG. 5 |
| 2,972,000 | 2/1961 | Boriolo | 264/324 X |
| 2,980,208 | 4/1961 | Neumann | 55/521 X |
| 3,124,440 | 3/1964 | Hogg | 55/484 |
| 3,386,227 | 6/1968 | Czerwonka | 55/521 X |
| 3,386,231 | 6/1968 | Nutting | 55/484 X |
| 3,410,062 | 11/1968 | Hart | 55/521 X |
| 3,502,767 | 3/1970 | Morrison et al. | 264/324 X |
| 3,537,241 | 11/1970 | Wiegel et al. | 493/941 R |
| 3,622,446 | 11/1971 | Burnham | 55/528 X |
| 3,774,375 | 11/1973 | Smith | 55/382 |
| 3,807,147 | 4/1974 | Schoonen et al. | 55/381 X |
| 3,947,537 | 3/1976 | Buntin et al. | 264/324 X |
| 3,985,852 | 10/1976 | Evans | 264/342 R X |
| 4,056,375 | 11/1977 | Ringel et al. | 55/514 X |
| 4,154,587 | 5/1979 | Gerok | 55/521 X |
| 4,454,189 | 6/1984 | Fukata | 264/324 X |
| 4,765,915 | 8/1988 | Diehl | 264/324 X |

FOREIGN PATENT DOCUMENTS

| | | | |
|---|---|---|---|
| 0214374 | 3/1987 | European Pat. Off. | |
| 0250801 | 1/1988 | European Pat. Off. | 55/497 |
| 2137309 | 2/1973 | Fed. Rep. of Germany | 55/521 |
| 2345820 | 4/1974 | Fed. Rep. of Germany | |
| 83035435 | 7/1983 | Fed. Rep. of Germany | |
| 56-010312 | 2/1981 | Japan | 55/521 |
| 0557191 | 12/1974 | Switzerland | 55/521 |

Primary Examiner—Robert Spitzer
Attorney, Agent, or Firm—Owen J. Meegan; Aubrey C. Brine

[57] ABSTRACT

A rigid self-supporting filter unit is produced by placing two portions of fiber fabric in face-to-face contact and stitching them along parallel regions, using two rows of stitches (16), to form pockets into which formers (20) are inserted to shape the pockets into a generally diamond shape. This assembly is then placed between two presser members (22, 24) which are corrugated, the "valleys" of the corrugations receiving the diamond-shaped formed portions. The presser members are heated and the portions are thus treated by heat and pressure to cause the fabric to be rendered rigid. The formers can then be removed. Suitable fibers for this purpose include a rigidising fiber known as P84, polyphenylene sulphide fibers, polyester fibers either alone or mixed with polypropylene fibers, and bicomponent fibers.

25 Claims, 2 Drawing Sheets

Fig_1

PROCESS FOR MANUFACTURING A SELF-SUPPORTING FILTER UNIT

BACKGROUND OF THE INVENTION

This invention is concerned with a process for manufacturing a self-supporting filter unit having a plurality of passages defined by air-permeable wall portions through which air to be filtered can pass and be drawn off along said passages but which prevent the passage therethrough of dust and/or other debris carried by such air.

Known dust filter units are in the form of bags which are supported against collapse by a framework of metal or other suitable material, air to be filtered being sucked through the bags from outside to the interior thereof so that dust particles and/or other debris are prevented by the material of the base from passing to the interior and thus collected on the outer surface; the pore size of the fabric of these filter bags is selected according to the size of dust particles to be filtered from the gas flow. Self-supporting filter units, i.e. units which do not require a framework of metal or other suitable material, are available; one such unit is supplied under the trademark "SINTAMATIC" by DCE Limited of Thurmaston, Leicester. This filter unit comprises a porous composite which is rigid and self-supporting, being made by a process in which a blend of granulated engineering polymers is dimensionally restrained and processed to produce a rigid porous composite element. The surface of this element is then treated with a P.T.F.E.-based solution to form a microporous skin. While this self-supporting filter has been shown to be generally satisfactory in performance, it is somewhat expensive to provide and the production process is relatively complex.

OBJECTS OF THE INVENTION

It is thus one of the various objects of the present invention to provide a process for manufacturing a self-supporting filter unit whereby a unit which is less expensive can be produced, the process itself being a relatively simple one.

It is another of the various objects of the present invention to provide an improved self-supporting filter unit which is relatively simple and inexpensive to produce and which can readily replace units which are currently in use in filter assemblies.

SUMMARY OF THE INVENTION

The first of the objects referred to above is resolved in accordance with the present invention, in a process as set out in the first paragraph above, in that such process comprises positioning two portions of flexible air-permeable fiber fabric in face-to-face contact, securing said portions together along spaced selected regions to form a plurality of passages each open at at least one end, inserting into each passage a former having a shape corresponding to a cross-sectional shape to be imparted to the passage, and, with the formers thus inserted and the passages thus shaped, treating the fabric to render it rigid, while retaining its air-permeability. Using such a process there is thus now no need for complicated moulding units, but rather relatively simple formers can be used and a selfsupporting filter unit is simply produced.

It has been found that in order more sharply to define the shape of the finished unit, and indeed better to consolidate the wall portions thereof during the step of rendering the wall portions rigid, it is advantageous if, with the formers inserted as aforesaid, the fabric portions are pressed between two opposed corrugated presser members, the corrugations of which are aligned peak-to-peak, the spacing between the peaks corresponding to that between the regions along which the fabric portions are secured together and the cross-sectional shape of the corrugations corresponding to that of the formers.

In carrying out one method in accordance with the invention the fiber fabric is preferably rendered rigid upon being heated above a predetermined temperature; in some instances, moreover, the heating should not take place above a second, higher, predetermined temperature. Where presser members are used as described above, furthermore, conveniently the fiber fabric portions are heated by heating the presser members, for which purpose the presser members are made of a material with good thermal conductivity. It will, however, be appreciated that the fiber fabric may be rendered rigid by treating the fibers in other ways: for example, they may include a component which is activated by exposure to ultra-violet light, or may contain an adhesive component which is rendered active by exposure to a suitable catalyst or other activating element.

For securing the fabric portions together as aforesaid, preferably stitching is used, more particularly spaced parallel rows of stitching along each region along which the fabric portions are to be secured. Moreover, preferably the regions along which the fabric portions are secured together extend parallel to one another and are spaced by equal intervals.

The two fabric portions placed in face-to-face contact may be provided by a single layer of material folded over on itself or by two separate layers laid one over the other. Alternatively, each portion may comprise a plurality of layers. Moreover, whereas the layers may be secured together prior to the securing together of the portions as aforesaid, conveniently, especially when the portions are secured together by stitching, all the layers may be secured together in a single securing operation.

Where the two portions are formed from one or more layers folded over on itself/themselves, the passages are closed at one end by reason of the foldover, whereas in the case of separate portions the passages are preferably closed at one end by stitching. Indeed, even if the fabric portions are provided by a folded-over layer or layers, nevertheless desirably the ends of the passages adjacent the fold are themselves stitched. By so stitching them, this allows subsequent trimming, if necessary, of the fabric material to be effected without opening the passages.

At the end of the filter unit adjacent the open end of the passages, conveniently, for providing a mounting for the filter unit in a filter assembly or the like, a flange is formed integral with the wall portions of the passages, into which flange the open ends of the passages open. More particularly, for forming the flange the regions at which the fabric portions are secured together as aforesaid do not extend up to the edge of the fabric portions, thus leaving an end region of the fabric portions unsecured, such end region then being folded outwardly and the fabric of said region then being treated to render it rigid. In a preferred process, furthermore, the flange is rendered rigid at the same time as the wall portions of the passages. Moreover, if desired, a portion of material may be secured to the flange for reinforcing it, such reinforcing material being of the same material as the flange and being secured to the flange prior to the treatment for rendering it rigid. If the material does not satisfactorily bond to itself, moreover, a separate bonding layer of material may be interposed between the flange and said portion of material.

In manufacturing a filter unit using a process in accordance with the invention the fibers chosen to produce the fiber fabric are desirably selected according to the use to which the filter is to be put. The fibers which are used will have a suitable decitex and will be formed into a fiber fabric by one of the known production techniques for non-woven fiber fabrics to provide a desired fabric density. One such technique involves the production of a fiber felt by a carding and needle punching process, the weight per unit area of the felt, the needle size and the needle punch density being selected according to the desired final application. Thus, in one example the fiber fabric is a non-woven fabric made from polyimide fibers which become rigid when heated at temperatures above the glass transition temperature of the fibers. One suitable polyimide fiber is supplied under the designation P84 by Lenzing AG. Filter units made of such fibers are already used, but in a non-rigidised state, one of the advantages of these fibers being that they are suitable for operations at temperatures up to at least 200° C. and in addition are substantially inert to attack from a wide variety of chemicals which may be carried in the air stream for filtration. Moreover, P84 fibers have a strong tendency, especially when heated to the glass transition temperature, which is in the order of 315° C., to shrink and in this way the fabric made therefrom accurately takes the shape of the formers and/or presser members, providing a well-defined filter unit with well-finished surfaces and good internal strength to render the filter self-supporting.

Instead of using fibers which rigidise upon being heated, a non-woven fabric made from thermoplastic fibers may be used. In this case, it is important, in order to maintain the air-permeability of the material, that the fibers are not melted but are heated close to their melting point firstly to provide a degree of shrinkage, in order to ensure a well-defined filter unit, and secondly in order to soften the fibers and cause them to bond together without however forming a continuous film. One such material is made from polyphenylene sulphide fibers, more particularly a fiber obtained from Phillips Fibers Corporation under the designation Ryton PPS fibers. Such fibers have a melting point in the order of 285° C. and are capable of operating at temperatures up to 190° C. on a continuous basis, or somewhat higher temperatures in surges. In addition these fibers have excellent resistance to a wide range of acids and alkalines and are not soluble in any known solvent below 200° C. Furthermore, the material made from such fibers is classified as non-inflammable.

It is already known to manufacture filter bags using these fibers, but it has not previously been proposed to provide self-supporting filter units using fabrics made from such fibers. Surprisingly, however, it has been found that such fibers can be used to produce self-supporting filter units without detriment to the air-permeability of such units using the process in accordance with the present invention.

As an alternative to thermoplastic fiber, polyester fiber may be used generally in the same manner as in using the Ryton fibers. In this case of course the melt temperature of the fibers is somewhat lower, being in the order of 240° C., and the self-supporting filter unit produced using polyester fibers is clearly useful only at much lower operating temperatures than the Ryton fiber fabric or the P84 fiber fabric. Nevertheless, a satisfactory self-supporting filter unit can be produced from polyester fibers using the process in accordance with the present invention.

It is also possible to use fiber fabrics which are made from mixtures of fibers. For example, one material which has been found suitable comprises 55 to 80 parts by weight polyester fibers and 45 to 20 parts by weight polypropylene fibers; in a preferred material moreover the ratio of polyester fibers to polypropylene fibers is 70:30 parts by weight. In this case, it will be appreciated, the polypropylene fibers have a lower melt temperature than the polyester fibers so that it is possible, by the application of heat to a temperature above the melt temperature of the polypropylene but below the melt temperature of the polyester, to melt the polypropylene fibers and cause the molten polypropylene to flow among the polyester fibers to bond them together, the application of heat at the same time causing significant shrinkage of the polypropylene fibers and shrinkage also, but to a lesser extent, of the polyester fibers, so that the fabric closely conforms to the shape of the formers and/or presser members, resulting in a well-defined filter unit having good self-supporting properties.

As yet another example, moreover, the fabric may be made up of a mixture of bi-component fibers and other suitable fibers, wherein at least 5% parts by weight of bi-component fibers are used. The feature of bi-component fibers is of course that one of the components has different properties from the other, usually a lower melt point, so that again by the application of heat up to the melt temperature of the one component, but falling short of the melt temperature of the other component, said one component can flow and serve to bond not only the other fibers, but also the other component of the bi-component fibers with a result that the fabric is stiffened, the application of heat at the same time usually causing shrinkage to some extent of all the fibers, resulting in a well-defined filter unit having good self-supporting properties.

As a further alternative, a non-woven fabric may be used which is impregnated with a suitable quantity of a resinous stiffening material which material may stiffen with or without the application of heat. Such stiffening material may be supplied as a latex with a relatively low pick-up, e.g. 10% to 30% by weight of the non-woven fiber fabric. As examples of such a latex, furthermore, reference is made to styrene homopolymer and copolymer latices.

As already mentioned within the scope of the invention it is also contemplated that multi-layer fabrics may be used. It has been found advantageous in some circumstances, when using the fiber fabrics referred to above, to use two or more layers rather than a single layer. Moreover such layers may be "tacked" together by light needling, especially if they are of different thickness, or may remain not secured together, especially if of substantially the same thickness, and being secured together only when the portions are secured as aforesaid.

Also embraced within the scope of the present invention, however, is the use of multi-layer fabrics wherein the various layers exhibit different desirable properties for the production of a self-supporting filter unit. For example, an outer surface layer would desirably provide for easy release of dust and/or other debris adhering thereto, while an inner surface layer would have no tendency to adhere to the formers during the manufacturing process, and in addition at least one of the layers would exhibit at least one of the following properties and at least one or the other of the layers the other of the following properties, namely good filtration of air passing therethrough and the necessary rigidity to render the filter unit self-supporting.

The invention further provides, in yet another of its several aspects, a self-supporting filter unit having a plurality of passages defined by corrugated wall portions of a rigid air-permeable fiber fabric, secured together along the peaks of the corrugations, through which wall portions air can pass and be drawn off along the passages but which prevent the passage therethrough of dust and/or other debris carried by such air, wherein the passages are closed off at one end and at the other there is formed integral with said wall portions a rigid outwardly flanged portion into which the passages open and which provides a mounting whereby the filter unit can be supported as part of a filter assembly.

Regardless of the particular fiber fabric used in carrying out the process in accordance with the invention to produce filter units, it may in each case be desirable to apply to the outer surface of the fabric a release coat, e.g. a P.T.F.E. coating, at an appropriate density.

BRIEF DESCRIPTION OF THE DRAWINGS

There now follows a detailed description, to be read with reference to the accompanying drawings, of one process in accordance with the invention for making filter units and of various filter units made using the said process. It will of course be appreciated that this process and there filter units have been selected for description merely by way of exemplification of the invention and not by way of limitation thereof.

In the accompanying drawings.

DESCRIPTION OF THE PREFERRED EMBODIMENTS

Figure 1:
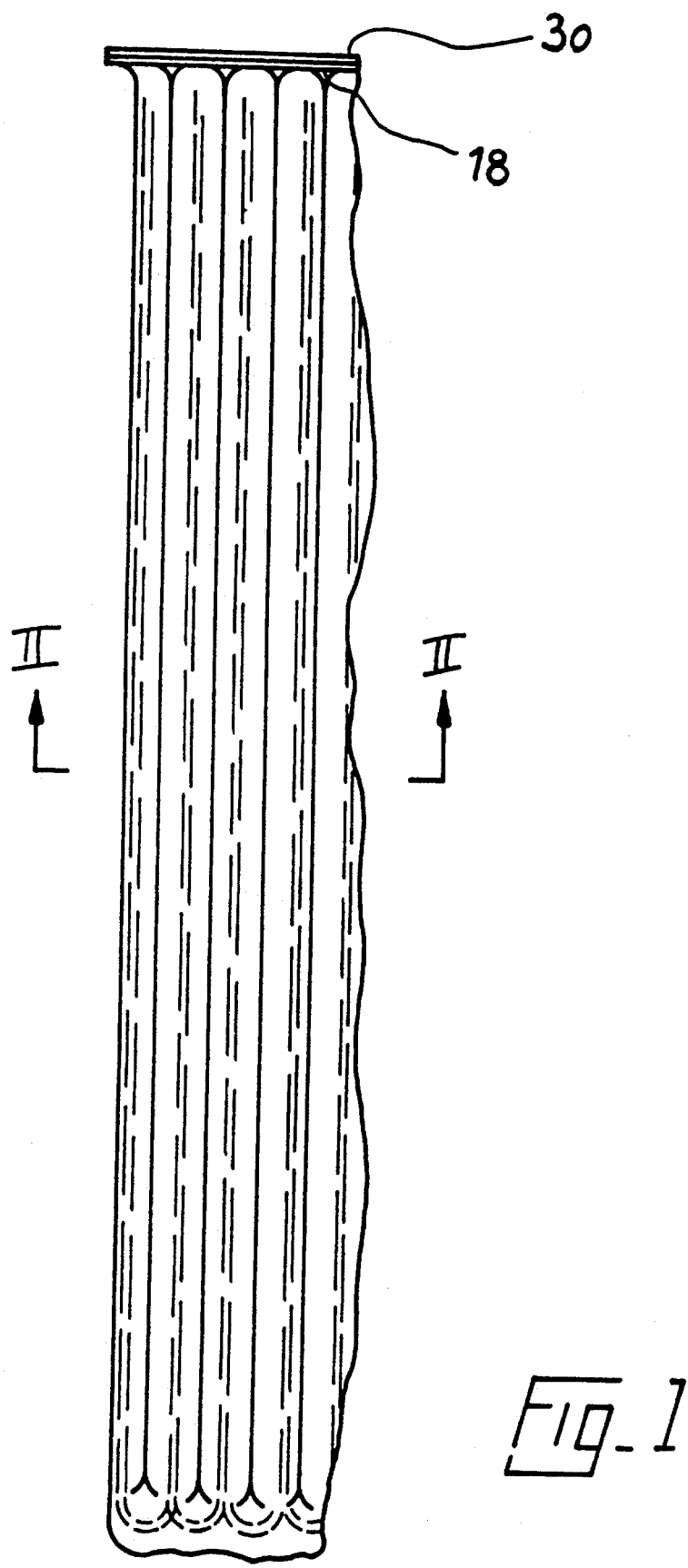
FIG. 1 is a fragmentary view of a filter unit in accordance with the invention, manufactured using a process in accordance with the invention.
Figure 2:
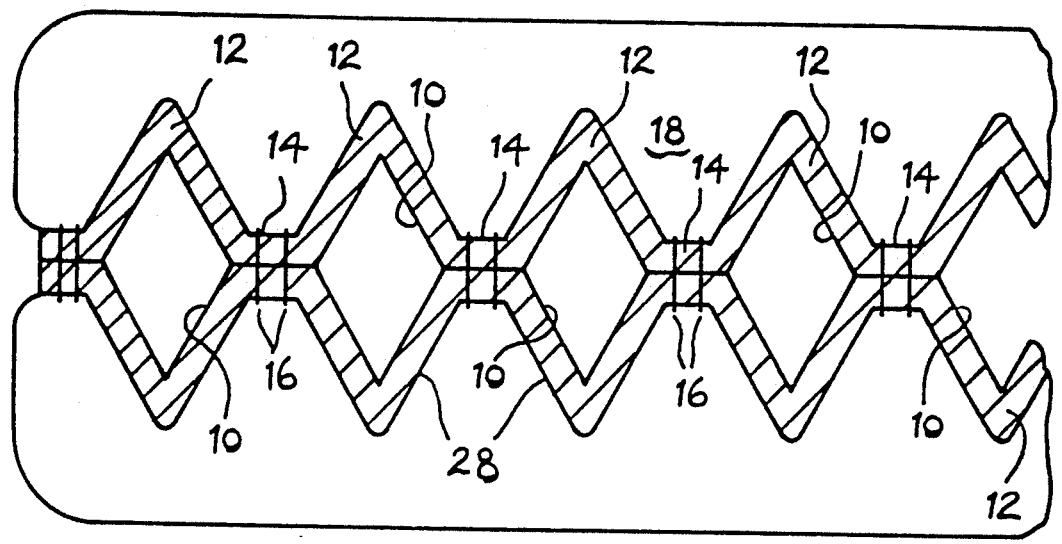
FIG. 2 is a sectional view along the line II—II of FIG. 1.

The filter unit shown in FIGS. 1 and 2 has a plurality of passages 10 defined by rigid corrugated air-permeable wall portions 12 through which air to be filtered can pass and be drawn off along said passages but which prevent the passage therethrough of dust and/or other debris carried by such air. The passages 10 are each of a generally diamond cross-section shape, the wall portions 12 being joined together along the peaks 14 of the corrugations by two parallel rows of stitches 16. At one end, the lower end in FIG. 1, each passage 10 is closed by the double row of stitches following an arcuate path to meet the stitches extending along the adjacent peak 14, while at the opposite end the passages are open. Along the edge of the filter unit, adjacent the open ends of the passages, furthermore, a flange 18 is formed integral with the wall portions 12, said flange being laminated with a reinforcing layer 30 of generally the same outline as the flange, and said reinforcing layer having formed therein apertures which are aligned with the open ends of the passages 10. The flange serves to provide a mounting for the filter unit in a suitable filter assembly.

The process in accordance with the invention is used to manufacture the aforementioned filter unit, to which end two portions of a suitable fiber fabric are laid in face-to-face contact (said portions being provided either by the fabric being folded over on itself or by two separate portions of the fabric) and the portions are then secured together by the rows of double stitches 16 as shown in FIG. 2. It will be noted that at the closed end of the passages 10 (the lower end shown in FIG. 1) the stitches follow an arcuate path and join up with the stitches from the adjacent passage, thus closing one end of each passage, while at the opposite end the rows of parallel stitches stop short of the edge of the fabric, which, in carrying out the process in accordance with the invention, is then folded outwardly to form a flange 18 to which is then secured the reinforcing layer of material 30, of similar outline to the flange 18, in order to reinforce the latter. It should be noted that if the fiber fabric exhibits tendencies to adhere to itself, e.g., under conditions of heat and pressure, the flange 18 and layer 30 will adhere during the manufacturing process; otherwise, an intermediate bonding layer (not shown) should be provided between the flange 18 and the material layer 30.

With the portions of fabric secured by stitching as aforesaid, thereby forming passages 10 in the form of pockets in the material, formers 20 are inserted into each such passage or pocket. Each former 20 has a generally diamond-shaped cross-section and thus the wall portions 12 defining each passage are themselves thus shaped to a corresponding diamond shape. In carrying out the process in accordance with the invention now being described, the fabric, with the formers thus inserted and the passages thus shaped, is placed between two presser members 22, 24 which have mating corrugated surfaces, the arrangement being such that with the corrugations arranged peak-to-peak the "valleys" correspond in shape to the shape of the formers 20 and are spaced so as to each receive a former, with the material held thereon being accommodated in the valley. Between the valleys, moreover, the peaks 26 are flattened and correspond to, and impart the desired shape to, the regions of the fiber fabric which have been stitched. The rows of stitches are preferably arranged such that the stitches are formed along the edges of the flattened peaks.

Figure 3:
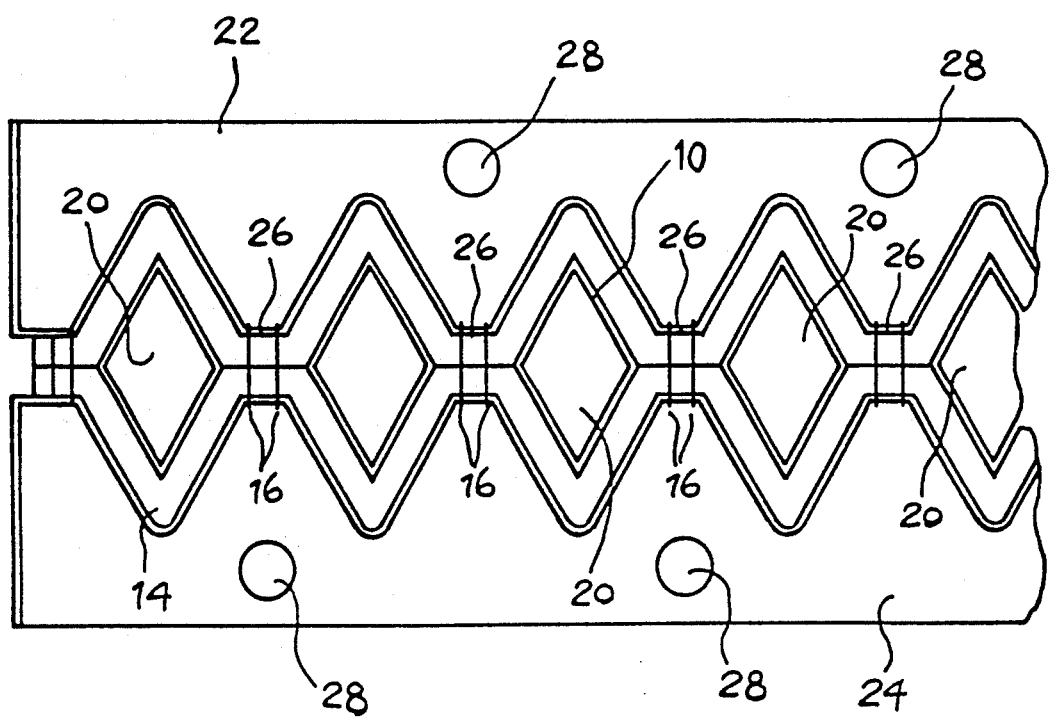
FIG. 3 is a fragmentary view, similar to FIG. 2, but showing formers and presser members whereby the filter unit is shaped in carrying out the process in accordance with the invention.

It will be noted from the left-hand side of FIG. 3 that the edge of the filter unit is clamped between two flat plate portions of the presser members 22, 24. These have the function of holding the edge of the material during the application of heat and pressure (to be referred to hereinafter) and also serve to form a land along the outer edge of the finished filter unit.

The fiber fabric used in carrying out the process in accordance with the invention is prepared by known non-woven felt manufacturing techniques, including a needle punching operation. Moreover, the fibers used in the production of fabric to be used in said process are such that the fabric can be rendered rigid while retaining its air-permeability. In carrying out the process in accordance with the invention now being described, furthermore, the fabric is rendered rigid upon being heated above a predetermined temperature, to which end the presser members 22, 24 are each provided with heaters 28 embedded therein. By the application of heat and pressure, the fibers of the fabric are caused to shrink (the degree of shrinkage being of course dependent upon the nature of the fibers themselves) and the fibers are consolidated to form a rigid self-supporting structure in the finished filter unit. To this end, the fibers used may be of a type which, upon being heated to temperatures above the glass transition temperature, are rigidised, whether in conjunction with significant shrinkage or otherwise. Alternatively the fibers may be thermoplastic fibers which, upon being heated to a temperature below but near to the melt temperature of the thermoplastic material, flow and become bonded at random areas, but without detriment to the air-permeability of the finished material. Again, the fibers may be of two distinct materials with different characteristics, especially melt characteristics, and in this case by melting the fibers having the lower melt temperature while leaving the other fibers unmelted, bonding of the fibers together can be achieved, together with a stiffening effect, but again without detriment to the air-permeability of the finished fabric. In such a case, moreover, the use of bi-component fibers has been found to be of particular benefit. As a still further alternative, moreover, multi-layer fabrics may be used. Such fabrics may comprise two or more layers of the same fabric, e.g. fabrics as discussed above, but also fabrics may be used the separate layers of which exhibit different features which are desirable in a rigid self-supporting filter unit.

The choice of fiber fabric to be used depends to a large extent upon the use to which the filter units are to be put. For example, in certain cases it is desirable that they be resistant to chemical corrosion and/or that they can operate at relatively high operating temperatures, e.g. up to 200° C. or more, whereas in other cases where the operating temperatures are low, e.g. ambient temperature, quite different materials may be used.

There now follows a number of Examples of different materials which have been found suitable for use in carrying out the process in accordance with the invention.

EXAMPLE 1

A non-woven fiber felt was produced using a blend of 50% by weight 1.7 decitex/60 mm and 50% by weight 3.3 decitex/60 mm staple polyimide fibers supplied under the designation P84 by Lenzing AG. The weight of the flexible fiber felt produced by the needle punching operation was about 400 grammes/square metre and the gauge was about 3.5 mm. These polyimide fibers are suitable for use in filter assemblies operating at temperatures up to about 200° C. These fibers moreover are very suitable for use in conditions where chemicals are present and also they are not soluble in any known solvent.

Two portions of the felt thus produced were laid in face-to-face contact and stitched as described above to form pockets therein open at one end and formers 20 were then inserted into each of the pockets, all as described above. The formers 20 thus carrying the formed portions of the felt were then arranged between the corrugated presser members 22, 24, which were then closed and the presser members were heated to a temperature somewhat in excess of the glass transition temperature of the P84 fibers, namely 315° C. At the same time, a pressure in the order of 0.525 MPa was applied between the presser members. The effect of thus heating the fiber fabric was firstly to cause significant shrinkage to take place, which was however constrained by the pressure applied between the presser members 22, 24 so that the risk of the fabric tearing, especially in the region of the stitches 16, was minimised. At the same time, the P84 fibers changed their condition to a rigid, crystalline, state, and in this way a rigid self-supporting filter unit was produced. The surface I provided on the filter unit manufactured using the above process was smooth. For enhanced filtration and improved release of dust from the surface, however, a micro-porous coating of P.T.F.E.-based film was applied to said surface after manufacture.

The filter units made using this material were resistant to all usual organic solvents and showed excellent resistance to acid and many alkalis. They were furthermore capable of operating at continuous temperatures of up to 260° C. and maximum temperatures of up to 300° C.

Instead of a blend of P84 fibers of different decitex, furthermore, good results have also been obtained using P84 fibers of 2.2 decitex and 60 mm length.

EXAMPLE 2

A non-woven fiber felt was produced using polyphenylene sulphide resin fibers of 3.3 decitex and 50 mm length, such fibers being supplied under the designation Ryton PPS fibers by Phillips Fibers Corporation. The weight and gauge of the flexible fiber felt produced were generally similar to that of Example 1, and the fibers were suitable for use in filter assemblies operating at continuous temperatures of up to about 180° C. These fibers moreover are very suitable for use in conditions where chemicals are present. Using a similar process to that disclosed in Example 1, two portions of the felt were laid in face-to-face contact and stitched and formers inserted into the pockets thus produced, prior to insertion of this assembly between the corrugated presser members. In this case the presser members were heated to a temperature in excess of 260° C. but below the melt temperature of the fibers, which in this case was 285° C. The effect of thus heating the fiber fabric was firstly to cause significant shrinkage to take place, which was however constrained by the pressure applied between the presser members, and at the same time the softening of the fibers allowed the fibers to become bonded together, while retaining the air-permeability of the material, and in this way, together with the relatively high applied pressure, a well-defined rigid filter unit was produced. After the unit had been thus manufactured, a micro-porous coating of a P.T.F.E.-based film was applied to the outer surface thereof in o order to achieve enhanced filtration and improved dust release.

The filter units made using this material were resistant to all usual organic solvents and showed excellent resistance to acid and many alkalis. They were furthermore capable of operating at continuous temperatures of up to 180° C. and maximum temperatures of 230° C.

EXAMPLE 3

In this Example the same process was carried out as in Example 2, except that the fibers in this case were a blend of 50% by weight 1.5 decitex/50 mm and 50% by weight 3.0 decitex/50 mm staple polyester fiber. Moreover, the temperature of the presser members during the forming operation was closely controlled and the fibers were heated to a temperature just below their melt point; the melt temperature of the polyester fibers used was 240° C., and the maximum temperature to which the fiber fabric was heated was 230° C. By so heating the fiber fabric a 9% shrinkage was achieved and this shrinkage, together with the pressure applied and the softening of the fibers to cause them to bond together, produced a well-defined filter unit. Again, a micro-porous coating of a P.T.F.E.-based film was applied to the outer surface after manufacture.

EXAMPLE 4

In this case a fiber fabric was used comprising a blend of polyester fibers and polypropylene fibers in a ratio of 70:30 parts by weight. The polyester fibers were of 1.5 decitex and 50 mm in length and the polypropylene fibers 2.8 decitex and 50 mm in length. The melt temperature of the polyester fibers was 240° C. and that of the polypropylene 165° C.

As in the previous Examples two portions of the material were laid in face-to-face contact and stitched as previously described, the formers were inserted and the assembly placed between the corrugated press members. In this case the presser members were heated to above the melt temperature of the polypropylene, thus causing the polypropylene to melt and flow, thereby bonding the polyester fibers together, while nevertheless maintaining the air-permeability of the fabric as a whole. In addition, the heat imparted caused shrinkage of the polypropylene fibers and to some lesser degree of the polyester fibers and that shrinkage together with the application of pressure produced a well-defined filter unit of relatively rigid material. As in the case of Example 3, the surface of the finished unit was coated with a micro-porous coating of the P.T.F.E-based film.

Filter units made of this material are of course capable of operating at lower temperatures than the first two Examples, and in general would be suitable for use up to operating temperatures of 100° C.

EXAMPLE 5

In this Example a fiber felt was produced using a bi-component fiber, more particularly a bi-component fiber of the concentric type having a core of a higher melting point and sheath of a lower melting point. In the particular Example a bi-component fiber identified as T252 supplied by Hoechst was used, having a decitex of 3.0 and a 50 mm length, the melt temperature of the sheath component being in the order of 110° C.

As in the previous example, the bi-component fiber fabric was heated, after stitching and the insertion of formers, to a temperature somewhat in excess of the melt temperature, of the sheath component which was thus caused to melt and flow and thus bond the core fibers together. Again, moreover, a well-defined self-supporting filter unit of rigid material was produced. Again, furthermore, as in the two previous cases, a micro-porous coating of a P.T.F.E.-based film was applied to the outer surface of the unit thus produced.

Filter units made using this material were capable of operating at ambient temperatures and indeed at temperatures up to 80° C.

Whereas in this Example it has been proposed to use 100% bi-component fibers for the production of the fiber fabric in question, according to the particular requirements and also bearing in mind that such bi-component fibers tend to be expensive, other fiber fabrics may be used in carrying out the process in accordance with the invention wherein the bi-component fabric content is from 5 to 100% by weight.

Whereas in each of the aforementioned Examples the fabric felt used comprised a single layer, fabric comprising two or more layers of such felt may be used, especially where it is desired to use a heavier fabric. In the case of the material of Example 1, for example, it may be desirable to use a material weighing 475 to 550 gsm. To this end a felt of 400 gsm weight was split into two layers, one 250 gsm in weight and the other 150 gsm. In one case a multi-layer portion of 550 gsm was obtained by laying a 400 gsm layer over a 150 gsm layer; in another case, a portion of 500 gsm weight was obtained by overlapping two layers each of 250 gsm weight. In carrying out the process described in Example 1 using multi-layer portions, the layers of each portion are not secured together prior to the portions being secured, but rather all the layers of the two portions are secured in one stitching operation. Thereafter the process is continued as described.

Instead of two or more layers of the same fabric being used, furthermore, alternatively layers exhibiting different properties may also be used within the scope of the present invention.

Whereas in the foregoing Examples the fabric has been prepared by a needle punching operation, it will be appreciated that fabrics made using other non-woven techniques may be employed, e.g. hydro-entangled, stitch-bonded or wet-laid fabrics, and indeed fabrics other than non-woven fabrics may also be used, e.g. knitted and woven fabrics.

I claim:

1. A self-supporting filter unit having a plurality of passages defined by wall portions formed from a rigid corrugated air-permeable non-woven fiber fabric made from one of the following group:
   polyimide fibers
   polyphenylene sulphide fibers
   polyester fibers
   a blend of polyester fibers and polypropylene fibers
   a blend of synthetic fibers comprising at least 5% by weight bi-component fibers, the wall portions being secured together along the peaks of the corrugations, through which wall portions air can pass and be drawn off along the passages but which prevent the passage therethrough of dust and/or other debris carried by such air, wherein the passages are closed off at one end and at the other there is formed integral with said wall portions a rigid outwardly flanged portion into which the passages open and which provides a mounting whereby the filter unit can be supported as a part of a filter assembly.

2. A unit according to claim 1 wherein a reinforcing layer material is secured to said flanged portion.

3. A unit according to claim 2 wherein the fabric is made from a blend of polyester fibers and polypropylene fibers, said blend containing 55 to 80 parts by weight polyester fibers and 45 to 20 parts by weight polypropylene fibers, the latter having been melted and thus bonded together with the polyester fibers.

4. A unit according to claim 2 wherein the fabric is made from a blend of synthetic fibers of which not less than 5% are bi-component fibers, one component of which, having a lower melting point, has been melted and thus bonded together with the remaining synthetic fibers.

5. A process for manufacturing of self-supporting filter unit having a plurality of passages defined by air-permeable wall portions through which air to be filtered can pass and be drawn off along said passages but which prevent the passage therethrough of dust and/or other debris carried by such air, the process comprising positioning in face-to-face contact two portions of flexible air-permeable non-woven fiber fabric made from one of the following group:
polyimide fibers
polyphenylene sulphide fibers
polyester fibers
a blend of polyester fibers and polypropylene fibers
a blend of synthetic fibers comprising at least 5% by weight bi-component fibers,
thereafter securing said portions together along spaced selected regions to form a plurality of passages each open at at least one end,
inserting into each passage formed having a shape corresponding to a cross-sectional shape to be imparted to the passage,
and, with the formers thus inserted and the passages thus shaped, pressing the fabric between two opposed heated presser members, the cross-sectional shape of which corresponds to that of the formers, to render the fabric rigid, while retaining its air-permeability.

6. A process according to claim 5 wherein the formers are each of a generally diamond-shaped cross-section and the presser members have opposed corrugated presser surfaces,
and wherein, with the formers inserted as aforesaid, the fabric portions are pressed between the two opposed corrugated presser surfaces, with the corrugations thereof aligned peak-to-peak, the spacing between the peaks corresponding to that between the regions along which the fabric portions are secured together.

7. A process according to claim 5 wherein the regions along which the fabric portions are secured together extend parallel to one another and are spaced by equal intervals.

8. A process according to claim 5 where the fabric portions are secured together as aforesaid by stitching.

9. A process according to claim 8 wherein the stitching comprises spaced parallel rows of stitching along each region.

10. A process according to claim 5 wherein the passages are closed at one end prior to the insertion of the formers.

11. A process according to claim 10 wherein the fabric portions are secured together as aforesaid by stitching in spaced parallel rows,
and wherein the passages are closed at one end by stitching as part of the same stitching operation.

12. A process according to claim 5 further comprising forming a flange, for providing a mounting for the filter unit, integral with the wall portions of the passages and at one end thereof, into which flange the open ends of the passages open.

13. A process according to claim 12 wherein the end, opposite the flange, of each passage c prior to the insertion of the formers and the formation of the flange.

14. A process according to claim 13 wherein the passages are closed at said opposite end aforesaid by stitching.

15. A process according to claim 12 wherein for forming the flange the regions at which the fabric portions are secured together as aforesaid do not extend up to the edge of the fabric portions, thus leaving an end region of the fabric portions unsecured, such end region then being folded outwardly and the fabric of said region then being treated to render it rigid.

16. A process according to claim 15 wherein the flange is rendered rigid at the same time as the wall portions of the passages.

17. A process according to claim 15 wherein a reinforcing portion of material is secured to t flange.

18. A process according to claim 17 wherein the reinforcing portion of material is of the same material as the flange and is secured to the flange prior to treating the material to render it rigid.

19. A process according to claim 18 wherein a separate layer of material is interposed between the flange and the reinforcing portion of material.

20. A process according to claim 5 wherein the flexible air-permeable non-woven fiber fabric is made from polyimide fibers and is rendered rigid when heated to temperatures in excess of 315° C.

21. A process according to claim 5 wherein the flexible air-permeable non-woven fiber fabric is made from polyphenylene sulphide fibers and is rendered rigid when heated to temperatures in excess of 205° C.

22. A process according to claim 5 wherein the flexible air-permeable fiber fabric is a non-woven fabric made from polyester fibers and polypropylene fibers in amounts ranging respectively from 55 to 80 to 45 to 20 parts by weight, in which fabric, when heated above the melting point of the polypropylene fibers, said fibers melt and flow to bond the polyester fibers together and thus render the fabric rigid.

23. A process according to claim 22 wherein the flexible air-permeable non-woven fiber fabric is made from a blend of polyester fibers and polypropylene fibers in a ratio of 70:30 parts by weight.

24. A process according to claim 5 wherein the flexible air-permeable non-woven fiber fabric is made from a blend of synthetic fibers comprising at least 5% by weight of bi-component fibers one component of which has a melting point of 110° C., in which fabric, when heated above said melting point, the low-melt components melt and flow to bond the remaining fibers together and thus render the fabric rigid.

25. A process according to claim 5 wherein the flexible air-permeable fiber fabric is a multi-layer fabric having at least an outer surface layer providing for easy release of dust and/or other debris adhering thereto and an inner surface layer having no tendency to adhere to the formers,
and wherein each layer of the fabric exhibits at least one of the following properties, namely good filtration of air passing therethrough, and the necessary rigidity to render the filter unit self-supporting,
and further wherein the various layers are secured together at the same time as the two portions of the fabric are secured along spaced selected regions as aforesaid.

* * * * *